Figure 1:
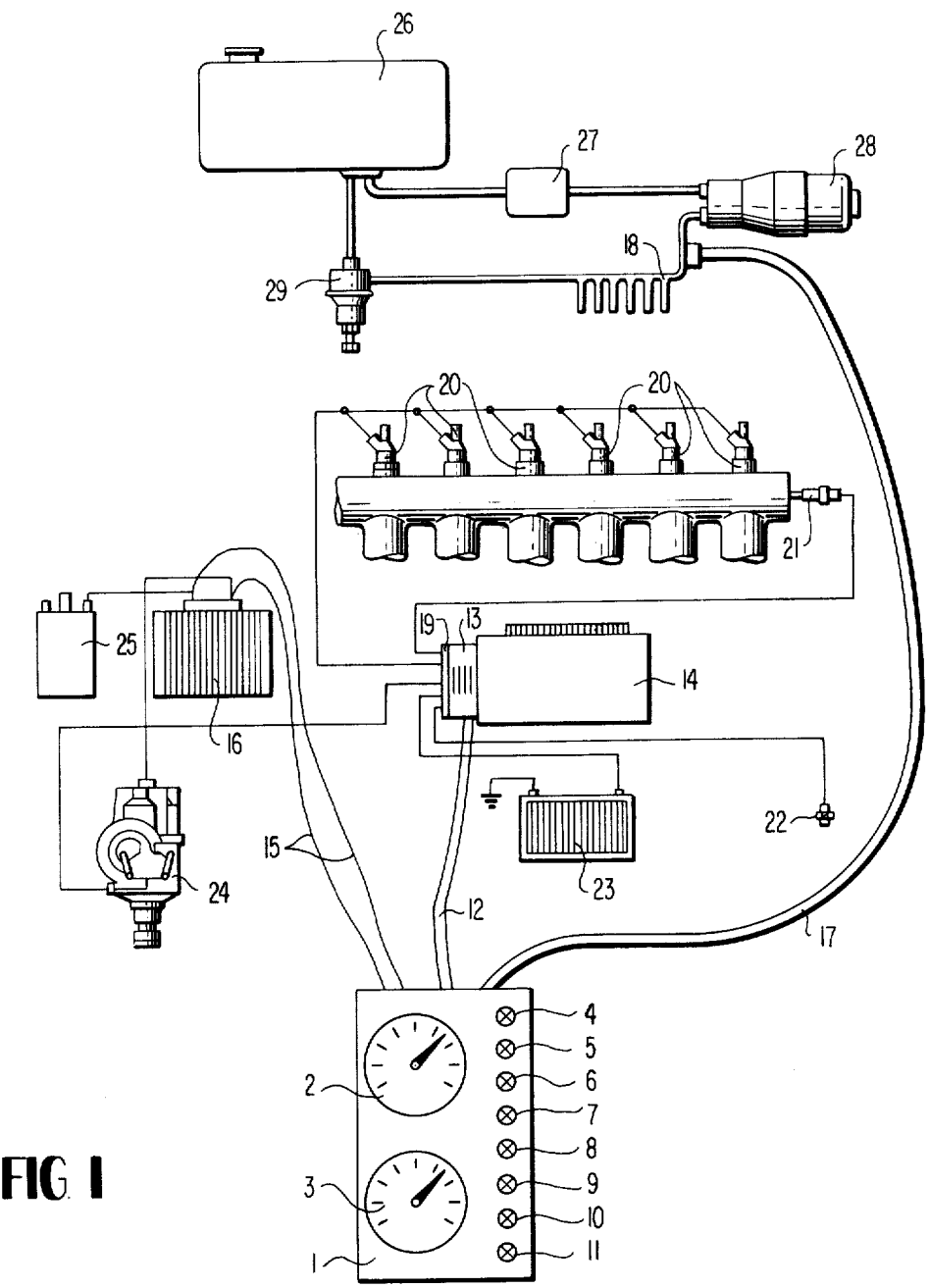

United States Patent
Krohn et al.

[11] 3,875,792
[45] Apr. 8, 1975

[54] INSTALLATION FOR TESTING AN ELECTRONICALLY CONTROLLED FUEL INJECTION SYSTEM IN INTERNAL COMBUSTION ENGINES

[75] Inventors: Erich Krohn, Hochdorf; Manfred Natter, Reichenbach, both of Germany

[73] Assignee: Daimler-Benz Aktiengesellschaft, Stuttgart, Germany

[22] Filed: June 15, 1973

[21] Appl. No.: 370,447

[30] Foreign Application Priority Data
June 16, 1972  Germany.......................... 2229372

[52] U.S. Cl............................................. 73/119 A
[51] Int. Cl........................................... G01m 15/00
[58] Field of Search ....... 73/117.3, 119 A; 324/149; 313/108 D

[56] References Cited
UNITED STATES PATENTS
| | | | |
|---|---|---|---|
| 2,010,047 | 8/1935 | Green | 324/149 |
| 2,708,701 | 5/1955 | Viola | 324/126 X |
| 3,558,897 | 1/1971 | May | 313/108 D |
| 3,630,076 | 12/1971 | Staudt | 73/117.3 |
| 3,732,492 | 5/1973 | Geul | 73/119 A X |

*Primary Examiner*—Jerry W. Myracle
*Attorney, Agent, or Firm*—Craig & Antonelli

[57] ABSTRACT

An installation for testing an electronically controlled fuel injection system and/or an electronic ignition system in internal combustion engines, especially in motor vehicle internal combustion engines, in which the connections from the different influencing magnitudes and to the electromagnetically actuated injection valves are connected to an electronic control apparatus by means of a common multi-connection plug; a portable indicating apparatus is thereby connected between the control apparatus and the common plug with the aid of an adaptor plug whereby the voltages, picked up either directly or by way of voltage drops produced across low-ohmic resistors, are adapted to be fed to the indicating apparatus which is equipped with a number of light diodes which serve as function indicators of the corresponding values and locations of the failures or troubles.

18 Claims, 2 Drawing Figures

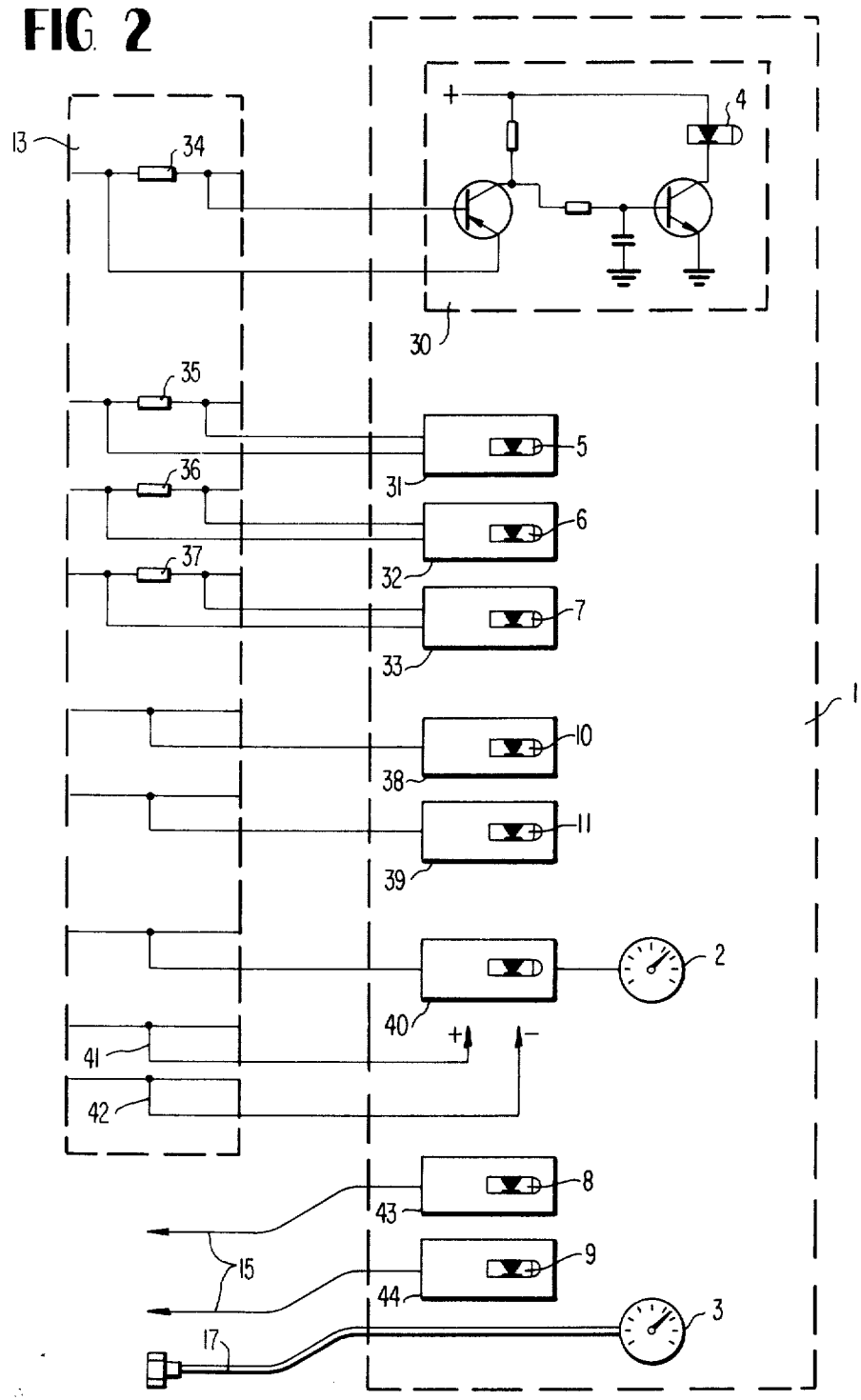

INSTALLATION FOR TESTING AN ELECTRONICALLY CONTROLLED FUEL INJECTION SYSTEM IN INTERNAL COMBUSTION ENGINES

The present invention relates to an installation for testing an electronically controlled fuel-injection system and/or an ignition system, especially an electronic ignition system in interal combustion engines, especially in motor vehicle internal combustion engines, whereby the connections of the different influencing magnitudes and the connections to the electromagnetically actuated injection valves are connected to an electronic control apparatus by means of a common multi-connection plug of conventional construction.

Electronically controlled fuel-injection and ignition systems are tested generally on test stands and in laboratories by means of costly measuring apparatus such as multi-purpose testing apparatus, oscillographs, etc., which, as a rule, are operated from the 220 volt line network. A test of disturbances or troubles occurring during the driving operation is thus not possible or requires complicated and expensive apparatus.

It is the aim of the present invention to provide an installation which makes it possible to detect or locate with simple means and both failures standstill as also in driving operation the troubles and failure which occur in such systems.

The underlying problems are solved according to the present invention in that a portable indicating apparatus is connected with the aid of an adaptor plug between the control apparatus and the common mult-connection plug and in that the voltages are picked up in the adaptor plug either directly or by way of voltage drops obtained with the use of resistors of low-ohmic values and are adapted to be fed to the indicating apparatus, and in that the indicating apparatus is equipped with a number of light diodes which serve as function indication of the corresponding values or places.

Since the indicating apparatus is constructed very handy and small and can be connected very rapidly by way of the adaptor plug, by means of which also takes place the energy supply of the indicating apparatus from the vehicle battery, tests can be readily carried out under actual driving conditions.

The current inputs to the injection valves are measured as voltage pulses by way of the low-ohmic resistances located within the adaptor plug in the feed lines to the injection valves or valve groups and are fed by way of pulse amplifiers to light diodes, for example, gallium arsenide diodes. If all injection valves or valve groups operate completely satisfactorily, then the light diodes flash or blink in the uniform rhythm of the injection sequence. Any disturbance or trouble is indicated, for example, by an irregular blinking and can be readily recognized by reason of the high rise and decay velocity of the light diodes notwithstanding the inertia of the human eye. Thus, for example, a winding short-circuit in an injection valve which has as a consequence a continuous injection, is indicated by a continuous lighting up of the coordinated light diode. An inadequate injection time of a valve leads to a lesser brightness of the light diode compared to the other light diode and indicates a trouble in the control apparatus, a flickering indication in all rotational speed ranges signifies worn or dirty contacts in the ignition distributor, etc. In order to render the apparatus more versatile, provision is made according to the present invention that the indicating apparatus includes two further light diodes which are controlled by way of conventional threshold switching devices and light up when the suction air temperature and cooling water temperature sensors supply values outside of the operating range (for example, by way of transfer resistances or interruption).

In order to be able to test the different shifting points of the fuel shut-off and of the fuel feed, provision is made according to the present invention that the indicating apparatus, in addition to the light diodes, includes a conventional rotational speed-measuring device which, however, is controlled in this case by the injecting pulses, as well as a conventional fuel pressure-measuring device.

In order to be able to better observe the different operating conditions of the light diodes-13 such as continuous lighting up, blinking, failures during short periods of time, full or slight brightness—and to be able to better evaluate the same, according to the present invnetion the light diodes are arranged recessed in the front plate of the indicating apparatus.

By means of altogether eight light diodes, namely, four light diodes for the injection valves or valve groups, two light diodes for the ignition system and one light diode each for a water and a suction air temperature sensor, and by means of the two indicating instruments for engine rotational speed and fuel pressure, the test equipment according to the present invention can be used for testing or trouble-shooting of the following functions:

1. Opening periods of the injection valve and all parts connected therewith such as control apparatus, throttle valve switch, pressure sensor, connecting cable set, slide-in contacts in the ignition distributor, plug connections, fuel shut-off, etc. 2. Fuel supply such as fuel pressure, feed pump, shifting relay, pump transistors, etc.

3. Rotational speed during fuel shut-off and fuel supply as well as rotational speed range of the occurring troubles or failures.

4. Ignition, i.e., interrupter, ignition coil, ignition distributor and possibly transistor switching apparatus, and 5. Water and suction air temperature.

Accordingly, it is an object of the present invention to provide an installation for testing electronically controlled fuel injection systems and transistorized ignition systems in internal combustion engines which avoids by simple means the aforementioned shortcomings and drawbacks encountered in the prior art.

Another object of the present invention resides in an installation for testing electronically controlled fuel injection systems and transistorized ignition systems in motor vehicle internal combustion engines which makes it possible to carry out tests not only during the standstill of the vehicle but also during actual driving conditions.

A further object of the present invention resides in an installation for testing electronically controlled fuel injection systems and transistorized ignition systems in internal combustion engines which offers great versatility yet is relatively simple and inexpensive.

A still further object of the present invention resides in a test equipment of the type described above which is very handy and compact, can be readily installed and permits the realization of tests in driving operation in an extraordinarily simple manner.

Another object of the present invention resides in a simple test equipment of the type described above which provides a clear unequivocal indication, which can be readily recognized by the human eye notwithstanding it simplicity in construction and design.

These and further objects, features, and advantages of the present invention will become more apparent from the following description when taken in connection with the accompanying drawing which shows, for purposes of illustration only, one embodiment in accordance with the present invention and wherein:

FIG. 1 is a schematic view illustrating the external appearance of the indicating apparatus in accordance with the present invention with the connections to the corresponding aggregates of the vehicle; and FIG. 2 is a schematic diagrammatic view of the internal construction of the indicating apparatus and adaptor plug in accordance with the present invention.

Referring now to the drawing wherein like reference numerals are used throughout the two views to designate like parts, FIG. 1 illustrates an indicating apparatus 1 having a conventional rotational speed measuring device 2, a conventional fuel pressure measuring device 3 as well as the slightly recessed light diodes 4 to 11, of which the light diodes 4 to 7 are coordinated to the injection valves or valve groups, the light diodes 8 and 9 to the ignition system, the light diode 10 to the water temperature and the light diode 11 to the suction air temperature. The indicating apparatus is connected by way of a multi-cable 12 and an adaptor plug 13 to the control apparatus 14 for the electronic fuel injection system of conventional construction. Two further cable connections 15 are clamped to the switching apparatus 16 for the electronic ignition and a pressure hose 17 connects the pressure-measuring device 3 with the fuel line 18.

The common multi-connecting plug 19 follows the adaptor plug 13, which common plug 19 is directly connected to the control apparatus 14 during normal operation. Connecting cables lead from the common plug 19 to the injection valves 20, to the suction air temperature sensor 21, to the water temperature sensor 22, to the starter battery 23 and to the ignition distributor 24. The ignition coil 25 is connected with the ignition distributor 24 and the switching apparatus 16. Additionally, the fuel tank 26, the fuel filter 27, the fuel pump 28, the pressure line 18 together with the lines leading to the individual injection valves 20 and the fuel pressure regulator 29, all of conventional construction, are also schematically illustrated in FIG. 1.

The interior construction of the indicating apparatus 1 and of the adaptor plug 13 are schematically indicated in FIG. 2.

Four pulse amplifiers 30 to 33 including the light diodes 4 to 7 are arranged on the inside of the indicating apparatus 1. The interal circuit of the pulse amplifier 30 is indicated in somewhat greater detail. In order to be able to detect the current flow from the control apparatus 14 to the injection valves 20, resistors 34 to 37 of low-ohmic value are connected in these feed lines on the inside of the adaptor plug 13, which resistors are so dimensioned that with the correct current, a voltage drop is produced in these resistors which is just sufficient in order to control the pulse amplifiers 30 to 33 and to light up the light diodes 4 to 7.

The two threshold switching devices 38 and 39 which are of conventional construction detect within the adaptor piug the voltage picked up by the temperature sensors of conventional construction and cause the diodes 10 and 11 to light up when the resistance value of the cooling water temperature sensor or of the water temperature sensor lies outside the operating value. The voltage pulses of the interrupter are detected in a further feed line and are fed to the rotational speed measuring device 2 by way of a conventional adaptor circuit 40. Additionally, the two feed voltages 41 and 42 for the supply of the indicating apparatus are picked-up in the adaptor plug 13.

The fuel pressure measuring device 3 with the pressure line 17 as well as two further pulse amplifiers 43 and 44 having light diodes 8 and 9 are additionally disposed in the indicating apparatus 1; the pulse amplifiers 43 and 44 are connected by way of connecting lines 15 to the switching apparatus 16 for the electronic ignition and, in a similar manner as with the injection pulses, supply indications concerning the manner of operation of the interrupter and transistorized switching apparatus.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for testing at least one of an electronically controlled fuel injection system and an ignition system in an internal combustion engine system wherein connections from sensor means sensing influencing magnitudes and from electromagnetically actuated injection valve means are connected to an electronic control means by way of a common multiconnection plug means, the installation comprising a portable indicating apparatus, and an adaptor plug means for connection between the electronic control means and the common multiconnection plug means, the adaptor plug means being responsive to at least the signals from the electronic control means to respective electromagnetically actuated injection valve means for providing output signals indicative thereof to the indicating apparatus, the indicating apparatus including a plurality of circuit means having light diode means, the circuit means being responsive to the electrical output signals from the adaptor plug means for lighting respective light diode means as an indication of the operation of respective electromagnetically actuated injection valve means.

2. An installation according to claim 1, characterized in that the ignition system is an electronic ignition system.

3. An installation according to claim 1, characterized in that the electrical output signals are voltages which are directly picked up in the adaptor plug means.

4. An installation according to claim 1, characterized in that the adaptor plug means includes resistor means having a low ohmic value by means of which voltage drops are produced for purposes of enabling the pickup of signals from the electronic control means.

5. An installation with suction air and cooling water temperature sensor means according to claim 1, characterized in that the indicating apparatus includes two further circuit means having threshold switching means and light diode means which are controlled by way of the threshold switching means and which light up when the sensor means for sensing the suction air temperature and the cooling water temperature supply values outside the predetermined operating range.

6. An installation according to claim 5, characterized in that transfer resistances are provided for supplying the values to the threshold switching means.

7. An installation according to claim 5, characterized in that said values are indicated by interruptions.

8. An installation according to claim 5, characterized in that the indicating apparatus, in addition to the light diode means, includes a rotational speed measuring means which is controlled by the electrical output signals of the adaptor plug means corresponding to the injection pulses for the electromagnetically actuated injection valve means, as well as a fuel pressure measuring means.

9. An installation according to claim 8, characterized in that indicating apparatus includes a front plate and that the light diode means are arranged recessed in the front plate.

10. An installation according to claim 9, characterized in that the ignition system is an electronic ignition system.

11. An installation according to claim 10, characterized in that the electrical output signals are voltages which are directly picked up in the adaptor plug means.

12. An installation according to claim 10, characterized in that the adaptor plug means includes resistor means having a low ohmic value by means of which voltage drops are produced for purposes of enabling the pick-up of signals from the electronic control means.

13. An installation according to claim 1, characterized in that the indicating apparatus, in addition to the light diode means, includes a rotational speed measuring means which is controlled by the electrical output signals of the adaptor plug means corresponding to the injection pulses for the electromagnetically actuated injection valve means, as well as a fuel pressure measuring means.

14. An installation according to claim 1, characterized in that indicating apparatus includes a front plate and that the light diode means are arranged recessed in the front plate.

15. An installation according to claim 1, characterized in that the light diode means are connected to the adaptor plug means such that the light diode means are lighted in the rhythm of the actuation of the electromagnetically actuated injection valve means.

16. An installation according to claim 15, characterized in that the light diode means are lighted in intensity in accordance with the duration of actuation of respective electromagnetically actuated injection valve means.

17. An installation according to claim 1, characterized in that the circuit means further includes pulse amplifier means responsive to the electrical output signals of the adaptor plug means for supplying energizing pulses to the light diode means.

18. An installation according to claim 1, characterized in that a light diode means is coordinated with a respective electromagnetically activated injection valve of the injection valve means for lighting in accordance with the operation of the respective injection valve.

* * * * *